US010969015B2

(12) United States Patent
George

(10) Patent No.: US 10,969,015 B2
(45) Date of Patent: Apr. 6, 2021

(54) SEAL SYSTEM FOR VARIABLE GEOMETRY GAPS IN AIRCRAFT SYSTEMS

(71) Applicant: The Boeing Company, Chicago, IL (US)

(72) Inventor: Nevin M. George, Lake Saint Louis, MO (US)

(73) Assignee: The Boeing Company, Chicago, IL (US)

( * ) Notice: Subject to any disclaimer, the term of this patent is extended or adjusted under 35 U.S.C. 154(b) by 455 days.

(21) Appl. No.: 15/788,539

(22) Filed: Oct. 19, 2017

(65) Prior Publication Data

US 2019/0120382 A1 Apr. 25, 2019

(51) Int. Cl.
*B64D 29/00* (2006.01)
*F16J 15/06* (2006.01)
(Continued)

(52) U.S. Cl.
CPC ............ *F16J 15/061* (2013.01); *B64D 29/00* (2013.01); *B64D 33/04* (2013.01); *F01D 11/003* (2013.01);
(Continued)

(58) Field of Classification Search
CPC ........ B64D 29/00; B64D 27/16; B64D 33/04; F16J 15/061; F16J 15/06; F02K 1/805; F01D 11/003
See application file for complete search history.

(56) References Cited

U.S. PATENT DOCUMENTS 3,121,995 A 2/1964 Albani
4,098,076 A 7/1978 Young et al.
(Continued)

FOREIGN PATENT DOCUMENTS

DE 69205901 7/1996
EP 1873426 1/2008
(Continued)

OTHER PUBLICATIONS

"Dynamic, High-Temperature, Flexible Seal", 2301 NTIS Tech Notes, Oct. 1, 1989, p. 859, XP000074165, ISSN: 0889-8464, US Department of Commerce, National Aeronautics and Space Administration, Brief, Springfield, VA, US.
(Continued)

*Primary Examiner* — Richard A Edgar
*Assistant Examiner* — Maxime M Adjagbe
(74) *Attorney, Agent, or Firm* — Haynes and Boone, LLP

(57) ABSTRACT

An apparatus comprising a housing, seal, and energy storing device. The housing is coupled to a structure in an exhaust system of an aircraft. The structure is positioned relative to a surface within the exhaust system such that a gap is present between the surface and structure. The seal has an end positioned in contact with the surface to reduce a flow of exhaust through the gap and is coupled to the housing such that the seal extends within the housing. The energy storing device is coupled to the housing and engaged with the seal to allow the seal to translate in a first direction relative to the housing when the gap increases and in a second direction opposite the first direction relative to the housing when the gap decreases such that the seal continues to reduce the flow of exhaust through the gap as the gap changes in size.

18 Claims, 10 Drawing Sheets

(51) Int. Cl.
  *F02K 1/80* (2006.01)
  *B64D 33/04* (2006.01)
  *F01D 11/00* (2006.01)
  *B64D 27/16* (2006.01)

(52) U.S. Cl.
  CPC .............. *F02K 1/805* (2013.01); *B64D 27/16* (2013.01); *F05D 2260/38* (2013.01)

(56) References Cited

U.S. PATENT DOCUMENTS

| | | | |
|---|---|---|---|
| 4,290,612 A | | 9/1981 | Stevens et al. |
| 4,917,302 A | | 4/1990 | Steinetz et al. |
| 5,288,020 A | * | 2/1994 | Pirker ...................... F16J 15/46 |
| | | | 239/127.3 |
| 6,702,300 B1 | * | 3/2004 | Steinetz ................. B64C 29/00 |
| | | | 239/265.11 |

FOREIGN PATENT DOCUMENTS

| | | |
|---|---|---|
| EP | 2587038 | 5/2013 |
| GB | 2265676 | 10/1993 |

OTHER PUBLICATIONS

Extended European Search Report from Application No. 20172268.3.-1010 dated Jul. 21, 2020, 11 pages.
Unknown, "Federn (1)—tec. Lehrerfreund", Aug. 22, 2008, XP055713508, Retrieved from the Internet: https://www.lehrerfreund.de/technik/ls/federn-1/3131, retrieved on Jul. 30, 2020, Original and Machine Translation provided, 5 pages.

* cited by examiner

US 10,969,015 B2

SEAL SYSTEM FOR VARIABLE GEOMETRY GAPS IN AIRCRAFT SYSTEMS

FIELD

The present disclosure relates generally to sealing gaps and, more particularly, to an apparatus and method for sealing gaps in aircraft systems where the gaps have variable geometrical configurations.

BACKGROUND

Oftentimes, the components in an exhaust system of an aircraft are positioned relative to each other such that gaps are present between these components. But, in certain conditions during flight, exhaust may leak through these gaps. In some cases, the leakage of exhaust through these gaps may affect aerodynamic performance. Thus, it may be desirable to reduce the leakage of exhaust through the gaps to within selected tolerances.

However, the gaps in some exhaust systems may change in size during flight. For example, the exhaust system of a jet engine system may include flaps that move relative to a surface of an inlet, nozzle, or other fixed structure of the exhaust system during operation of the jet engine system. Gaps may be defined between the flaps and the surface of the fixed structure to prevent contact between surfaces and allow for relative motion. However, these gaps may vary in size during flight due to the movement of the flaps, flight conditions, localized temperature, localized pressure, or a combination thereof. For example, a particular gap between a flap and a surface of a fixed structure may widen or narrow in response to movement of the flap relative to the surface or a change in temperature within the exhaust system. Sealing this type of gap using a seal that has sufficient durability and wear resistance while also being able to account for the changes in the size of the gap may be difficult.

SUMMARY

In one example embodiment, an apparatus comprises a housing, a seal, and an energy storing device. The housing is coupled to a structure in an exhaust system of an aircraft. The structure is positioned relative to a surface within the exhaust system such that a gap is present between the surface and the structure. The seal has an end positioned in contact with the surface to reduce a flow of an exhaust through the gap and coupled to the housing such that at least a portion of the seal extends within the housing. The energy storing device is coupled to the housing and engaged with the seal such that the energy storing device allows the seal to translate in a first direction relative to the housing when the gap increases and in a second direction opposite the first direction relative to the housing when the gap decreases such that the seal continues to reduce the flow of the exhaust through the gap as the gap changes in size.

In another example embodiment, an aircraft comprises a housing, a plurality of seals, and a plurality of energy storing devices. The housing is coupled to a structure in an exhaust system of the aircraft. The structure is positioned relative to a surface of the engine system such that a gap is present between the surface and the structure. The seals are arranged in a selected configuration to create a tortuous flow path through the gap. Each of the seals has an end positioned in contact with the surface to reduce a flow of an exhaust through the gap. Each of the energy storing devices is coupled to the housing and engaged with a corresponding seal of the seals to allow the corresponding seal to translate in a first direction relative to the housing when the gap increases and in a second direction opposite the first direction relative to the housing when the gap decreases such that the seals continue to reduce the flow of the exhaust through the gap as the gap changes in size.

In yet another example embodiment, a method is provided. A seal is positioned relative to a housing that is coupled to a structure in an exhaust system of an aircraft such that an end of the seal is positioned in contact with a surface of the exhaust system to reduce a flow of an exhaust through a gap between the surface and the structure. The seal is loaded using an energy storing device coupled to the housing and engaged with the seal to allow the seal to translate in a first direction relative to the housing when the gap increases and in a second direction opposite the first direction relative to the housing when the gap decreases such that the seal continues to reduce the flow of the exhaust through the gap as the gap changes in size.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The example embodiments described below provide various methods and related apparatuses for sealing gaps having geometrical configurations that may vary over time. The geometrical configuration of a gap may include the shape of the gap, the size of the gap, some other type of geometrical feature of the gap, or a combination thereof. The various seal systems described by the example embodiments may be capable of sealing a gap with a variable geometrical configuration while also having sufficient durability and wear resistance.

Figure 1:
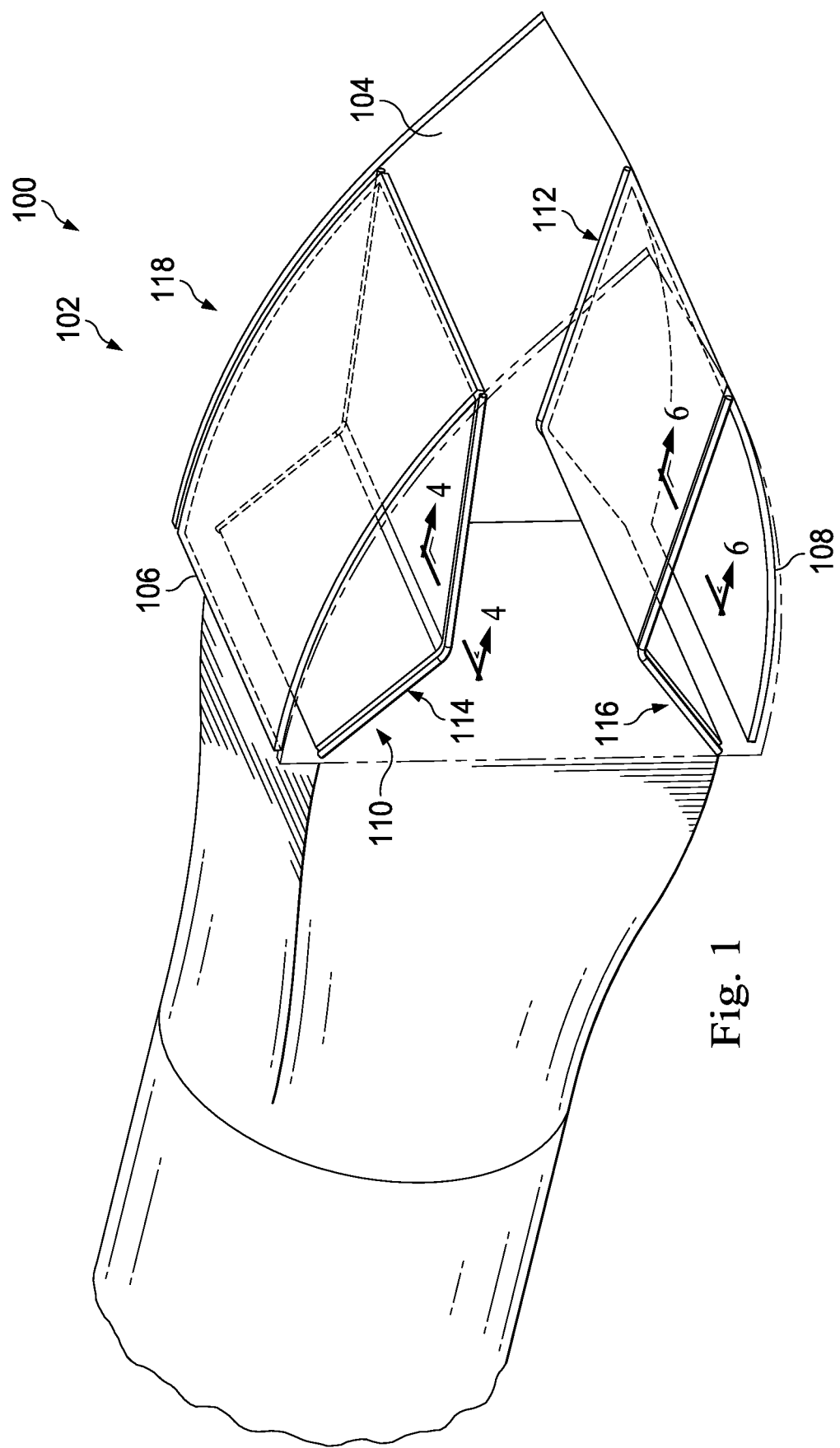
FIG. 1 is an illustration of an exhaust system for an aircraft with upper flaps and lower flaps in a first configuration in accordance with an example embodiment.

With reference now to the figures, FIG. 1 is an illustration of an exhaust system for an aircraft with upper flaps and lower flaps in a first configuration depicted in accordance with an example embodiment. In this illustrative example, exhaust system 100 is part of an engine system of an aircraft. More particularly, exhaust system 100 takes the form of a jet engine exhaust system 102. However, in other examples, exhaust system 100 may be some other type of exhaust system in the engine system of an aircraft or may be an exhaust system in the engine system of some other type of vehicle. In still other examples, exhaust system 100 may be separate from the engine system of the aircraft or vehicle.

Exhaust system 100 includes an interior surface 104, upper flaps 106, and lower flaps 108. Upper flaps 106 are positioned relative to interior surface 104 such that a gap 110 is present between upper flaps 106 and interior surface 104. Further, lower flaps 108 are positioned relative to interior surface 104 such that a gap 112 is present between lower flaps 108 and interior surface 104.

Exhaust system 100 also includes seal system 114 and seal system 116. Seal system 114 is used to reduce a flow of fluid through gap 110. Seal system 116 is used to reduce a flow of fluid through gap 112. A fluid, as used herein, may include one or more liquids, one or more gases, or a combination thereof. Exhaust may be one type of fluid. In one example embodiment, seal system 114 and seal system 116 are used to reduce the flow of exhaust through gap 110 and gap 112, respectively. Reducing the flow of exhaust through gap 110 and gap 112 may reduce the loss of aerodynamic performance and help reduce undesired temperature fluctuations in one or more materials or components of exhaust system 100.

The geometrical configuration of gap 110 and gap 112 may change in size during flight due to a number of different factors. For example, gap 110 and gap 112 may change in size during flight in response to at least one of the movement of upper flaps 406 and lower flaps 108 during flight, a flight condition of the aircraft, a temperature within exhaust system 100, or a pressure within exhaust system 100.

In one example embodiment, as depicted in FIG. 1, upper flaps 106 and lower flaps 108 are in a first configuration 118. However, during operation of the exhaust system 100, upper flaps 106, lower flaps 108, or both may move to put upper flaps 106 and lower flaps 108 into a different configuration relative to interior surface 104. Movement of upper flaps 106, lower flaps 108, or both relative to interior surface 104 may cause gap 110, gap 112, or both, respectively, to change.

As one illustrative example, during flight, the rotation of upper flaps 106 may cause a geometrical configuration of gap 110 to change. For example, the rotation of upper flaps 106 may cause a size of gap 110 to change. More particularly, gap 110 may widen or narrow when upper flaps 106 rotate relative to interior surface 104. Similarly, during flight, the rotation of lower flaps 108 may cause a geometrical configuration of gap 112 to change. For example, the rotation of lower flaps 108 may cause gap 112 to change in size. More particularly, gap 112 may widen or narrow when upper flaps 106 rotate relative to interior surface 104.

Seal system 114 comprises seals (not shown in this view) that translate in at least two directions to reduce a flow of the exhaust through gap 110 as gap 110 changes in size. Similarly, seal system 116 comprises seals (not shown in this view) that translate in at least two directions to reduce a flow of the exhaust through gap 112 as gap 112 changes in size. In some example embodiments, reducing a flow of exhaust through a gap, such as gap 110 or gap 112, includes reducing the flow of exhaust to within selected tolerances or below a selected threshold. In other example embodiments, reducing a flow of exhaust through a gap, such as gap 110 or gap 112, includes substantially preventing the flow of exhaust through the gap.

Figure 2:
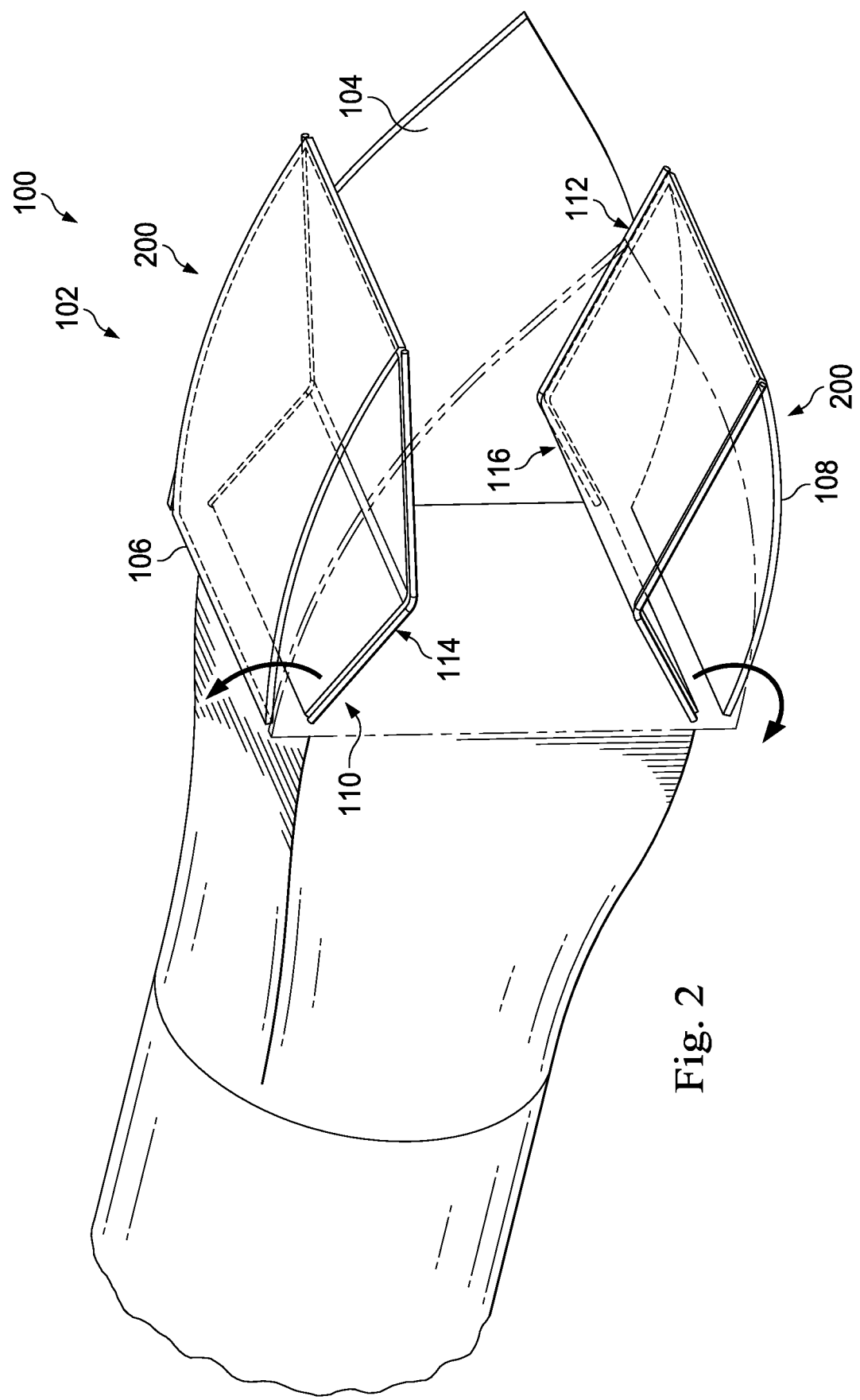
FIG. 2 is an illustration of the exhaust system from FIG. 1 with the upper flaps and lower flaps in a second configuration in accordance with an example embodiment.

FIG. 2 is an illustration of exhaust system 100 from FIG. 1 with upper flaps 106 and lower flaps 108 in a second configuration depicted in accordance with an example embodiment. In particular, upper flaps 106 and lower flaps 108 have rotated from first configuration 118 in FIG. 1 to a second configuration 200.

This rotation of upper flaps 106 and lower flaps 108 causes the geometrical configuration of gap 110 and gap 112, respectively, to change. For example, gap 110 and gap 112 may both be wider with upper flaps 106 and lower flaps 108 in second configuration 200 as compared to when upper flaps 106 and lower flaps 108 are in first configuration 118. Seal system 114 and seal system 116 ensure that a flow of exhaust through gap 110 and gap 112, respectively, is reduced, regardless of whether upper flaps 106 and lower flaps 108, respectively, are in first configuration 118, second configuration 200, or some other configuration. In other words, seal system 114 and seal system 116 accommodate the change in size of gap 110 and gap 112, respectively, to thereby reduce the flow of exhaust through these gaps regardless of the varying sizes of these gaps.

Figure 3:
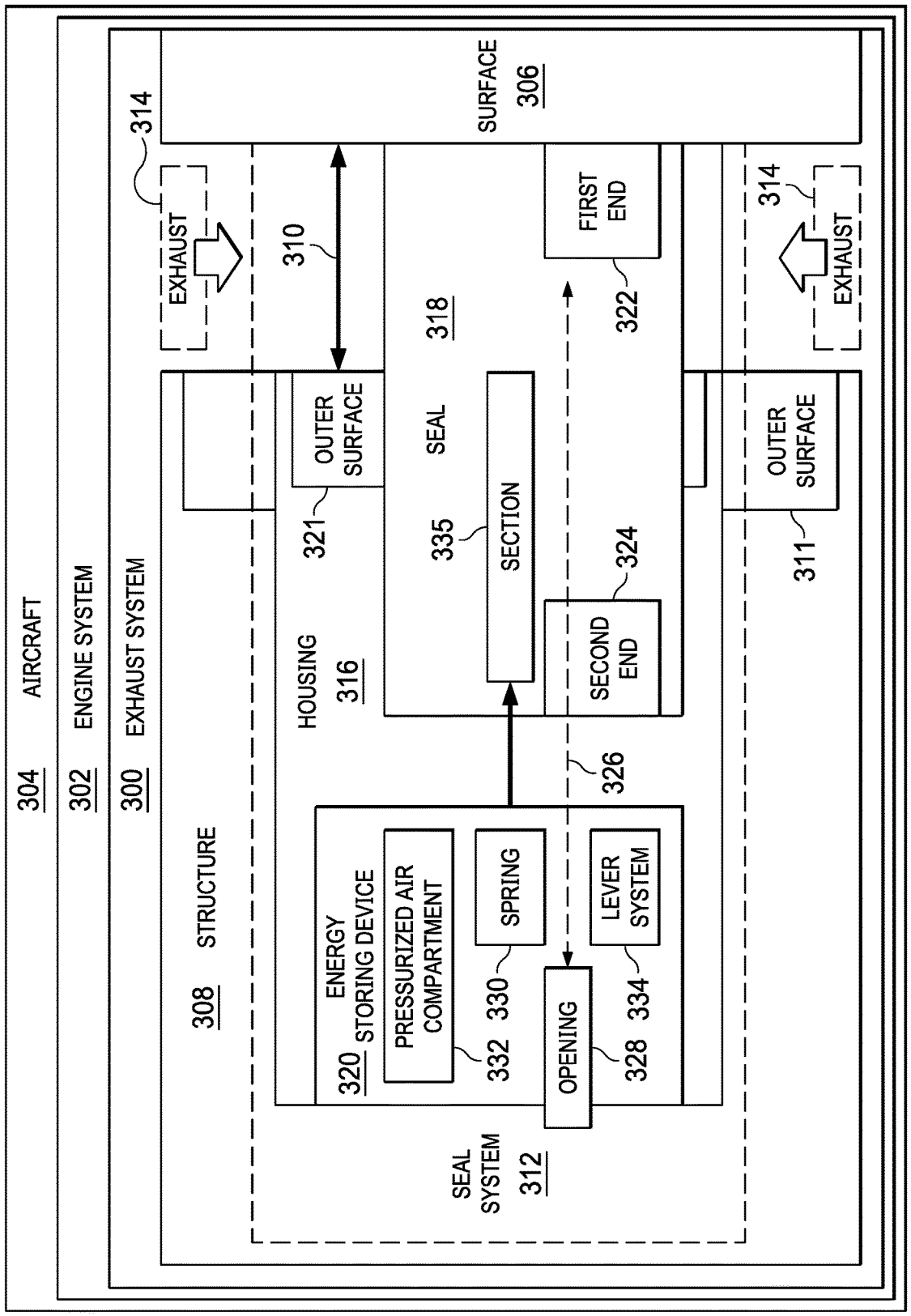
FIG. 3 is a block diagram of an exhaust system for an aircraft in accordance with an example embodiment.

With reference now to FIG. 3, a block diagram of an exhaust system for an aircraft is depicted in accordance with an example embodiment. Exhaust system 300 may be part of engine system 302 of aircraft 304. In some examples, engine system 302 is a jet engine system. Exhaust system 100 described in FIGS. 1 and 2 is an example of one implementation of exhaust system 300 in FIG. 3.

Exhaust system 300 includes surface 306 and structure 308. In one or more example embodiments, surface 306 may be an interior surface of a housing, inlet, nozzle, or other fixed structure of exhaust system 300. In other embodiments, surface 306 may be the outer surface of a component within exhaust system 300 that faces the interior of exhaust system 300.

Structure 308 may take different forms. For example, structure 308 may be any component within exhaust system 300 that is positioned relative to surface 306 and that is movable relative to surface 306. In one example embodiment, structure 308 includes one or more flaps. For example, each of upper flaps 106 and each of lower flaps 108, described in FIGS. 1 and 2, may be an example of one implementation of structure 308.

Structure 308 is positioned relative to surface 306 such that gap 310 is defined between structure 308 and surface 306. More particularly, gap 310 may be defined by the volume of space located between an outer surface 311 of structure 308 and surface 306. Each of gap 110 and gap 112 in FIG. 1 is an example of one implementation of gap 310 in FIG. 3. Seal system 312 is used to reduce the flow of fluid through gap 310. The fluid may include exhaust 314.

As illustrated in FIG. 3, seal system 312 includes housing 316, at least one seal 318 coupled to housing 316, and at least one energy storing device 320 coupled to the housing 316. Housing 316 is coupled to structure 308 such that housing 316 is positioned relative to surface 306. As used herein, a first component may be "coupled to" a second component by being directly or indirectly coupled to the second component or by being part of the second component. For example, housing 316 may be coupled to structure 308 by being a separate component that is attached to, secured to, fastened to, adhered to, welded to, or otherwise connected to structure 308. In other examples, housing 316 may be considered coupled to structure 308 by being defined as part of structure 308.

In one example embodiment, housing 316 is coupled to structure 308 such that an outer surface 321 of housing 316 is substantially flush with outer surface 311 of structure 308. In other example embodiments, outer surface 321 of housing 316 may extend beyond outer surface 311 of structure 308 in a direction towards surface 306. In still other example embodiments, outer surface 321 of housing 316 may not extend beyond outer surface 311 of structure 308.

Seal 318 of seal system 312 has a first end 322 and a second end 324 that is opposite first end 322. In one illustrative example, seal 318 has a cylindrical shape with a center axis 326. In one or more embodiments, the cylindrical shape of seal 318 between first end 322 and second end 324 may be defined by a fixed diameter along the length of center axis 326. In other embodiments, seal 318 may include different sections, each having a cylindrical shape with a different diameter, with all of the different sections being aligned along center axis 326.

First end 322 of seal 318 is positioned in contact with surface 306. First end 322 may be positioned in contact with surface 306 such that center axis 326 of seal 318 lies substantially normal to the portion of surface 306 in contact with first end 322. In one example embodiment, first end 322 is substantially flat. First end 322 may have a beveled edge that partially extends around first end 322 or fully extends circumferentially around first end 322. In some cases, first end 322 may have a rounded edge that extends circumferentially around first end 322. In other example embodiments, first end 322 has a curved shape.

Seal 318 is coupled to housing 316 such that at least a portion of seal 318 extends within housing 316. Specifically, seal 318 may extend from surface 306, across gap 310, and into housing 316. In one example embodiment, seal 318 may extend through housing 316 and out of housing 316 through opening 328 in housing 316. Further, seal 318 is coupled to housing 316 in a manner that allows relative movement between seal 318 and housing 316.

Seal 318 may be comprised of a number of different materials. In one example embodiment, seal 318 may be comprised of one or more materials that allow seal 318 to withstand the high temperatures experienced within exhaust system 300. For example, without limitation, seal 318 may be comprised of at least one of a metal alloy, a ceramic, or some other type of material capable of withstanding temperatures above about 1200 degrees Fahrenheit.

During the operation of aircraft 304, the geometrical configuration of gap 310 may change. Accordingly, gap 310 may also be referred to as a variable geometry gap. For example, during the operation of exhaust system 300 of aircraft 304, structure 308 may move relative to surface 306. This movement may cause the geometrical configuration of gap 310 to change. For example, movement of structure 308 relative to surface 306 may cause gap 310 to widen, narrow, or change in some other manner. Additionally, the geometrical configuration of gap 310 may change during flight in response to at least one of a flight condition of aircraft 304, a temperature within exhaust system 300, a pressure within exhaust system 300, or some other flight-based factor.

Seal system 312 is used to reduce the flow of exhaust 314 through gap 310 and is capable of accommodating for changes in the geometrical configuration of gap 310. More particularly, seal system 312 may be used to reduce the flow of exhaust 314 through gap 310, regardless of the direction in which structure 308 moves relative to surface 306, and regardless of any change in the geometrical configuration of gap 310 in response to the movement of structure 308 relative to surface 306. Accordingly, seal system 312 may be referred to as an omnidirectional seal system.

At least one energy storing device 320 is engaged with seal 318 to allow relative movement between seal 318 and housing 316. For example, without limitation, energy storing device 320 may be coupled to housing 316 and engaged with seal 318 to allow seal 318 to translate in a direction substantially parallel to center axis 326, relative to housing 316. In other words, energy storing device 320 may be coupled to housing 316 and engaged with seal 318 to housing 316 to translate in a direction substantially parallel to center axis 326, relative to seal 318. Depending on the implementation, energy storing device 320 may include at least one of a spring 330, a pressurized air compartment 332, a lever system 334, some other type of energy storing device, or a combination thereof.

In one example embodiment, energy storing device 320 includes at least one spring 330 that loads seal 318. Spring 330 may be, for example, a compression spring. Spring 330 may be attached to housing 316 and engaged with seal 318 such that spring 330 applies a force to a section 335 of seal 318. Loading section 335 of seal 318 ensures that first end 322 of seal 318 substantially maintains contact with surface 306. In some examples, section 335 of seal 318 may be an end portion of seal 318 positioned at second end 324 of seal 318. In other examples, section 335 may be a middle portion of seal 318.

Movement of structure 308 towards surface 306 may cause gap 310 to narrow (or decrease in size). Further, movement of structure 308 towards surface 306 causes movement of housing 316, which is coupled to structure 308, towards surface 306. Movement of housing 316 towards surface 306 causes spring 330, which is coupled to housing 316, to compress and store energy. The compression of spring 330 further loads section 335 of seal 318, ensuring that first end 322 of seal 318 substantially maintains contact with surface 306 as housing 316 translates along center axis 326 towards surface 306, relative to seal 318.

Movement of structure 308 away from surface 306 may cause gap 310 to widen (or increase in size). Further, movement of structure 308 away from surface 306 causes movement of housing 316, which is coupled to structure 308, away from surface 306. Movement of housing 316 away from surface 306 causes spring 330, which is coupled to housing 316, to extend. But the loading of section 335 of seal 318 by spring 330 ensures that first end 322 of seal 318 substantially maintains contact with surface 306 as housing 316 translates along center axis 326 away from surface 306, relative to seal 318.

Thus, spring 330 may continuously load seal 318 while allowing relative motion between housing 316 and seal 318 relative to center axis 326. When gap 310 decreases, spring 330 compresses, thereby allowing housing 316 to translate in a first direction substantially parallel to center axis 326 relative to seal 318. Further, when gap 310 increases, spring 330 extends, housing 316 translates in a second direction opposite the first direction relative to seal 318. In this manner, spring 330 ensures that seal 318 continues to reduce the flow of exhaust 314 through gap 310 even as gap 310 changes in size.

In another example embodiment, energy storing device 320 takes the form of pressurized air compartment 332. Second end 324 of seal 318 may be located within pressurized air compartment 332. Pressurized air within pressurized air compartment engages seal 318 to load or bias seal 318 in a direction towards surface 306. In particular, the pressurized air may continuously load or bias seal 318 in the direction towards surface 306.

When gap 310 decreases, pressurized air compartment 332 allows housing 316 to translate in a first direction substantially parallel to center axis 326 relative to seal 318 such that the pressure of air contained within pressurized air compartment 332 increases. When gap 310 increases, pressurized air compartment 332 allows housing 316 to translate in a second direction opposite the first direction relative to seal 318 such that the pressure of air contained within pressurized air compartment 332 decreases.

In yet another example embodiment, energy storing device 320 takes the form of lever system 334. Lever system 334 may be used to load or bias seal 318 in the direction towards surface 306. Lever system 334, which may function similar to a flipper, may be flexible to allow for relative motion between seal 318 and housing 316. In some examples, lever system 334 may include a lever coupled to an energy storing device, such as a spring, to enable lever system 334 to bias seal 318.

Thus, energy storing device 320 may be implemented in a number of different ways. Some of these example embodiments are described in greater detail in FIGS. 4-7 below.

The block diagram of exhaust system 300 in FIG. 3 is not meant to imply physical or architectural limitations to the manner in which an example embodiment may be implemented. Other components in addition to or in place of the ones illustrated may be used. Some components may be optional. Also, the blocks may be presented to illustrate some functional components. One or more of these blocks may be combined, divided, or combined and divided into different blocks when implemented in an illustrative embodiment.

In other example embodiments, exhaust system 300 may be separate from engine system 302. In still other example embodiments, exhaust system 300 may be part of a vehicle other than aircraft 304. The vehicle may be, for example, without limitation, a ground vehicle, a water vehicle, a space vehicle, or some other type of vehicle. In still other example embodiments, exhaust system 300 may be part of some other type of system or platform.

Figure 4:
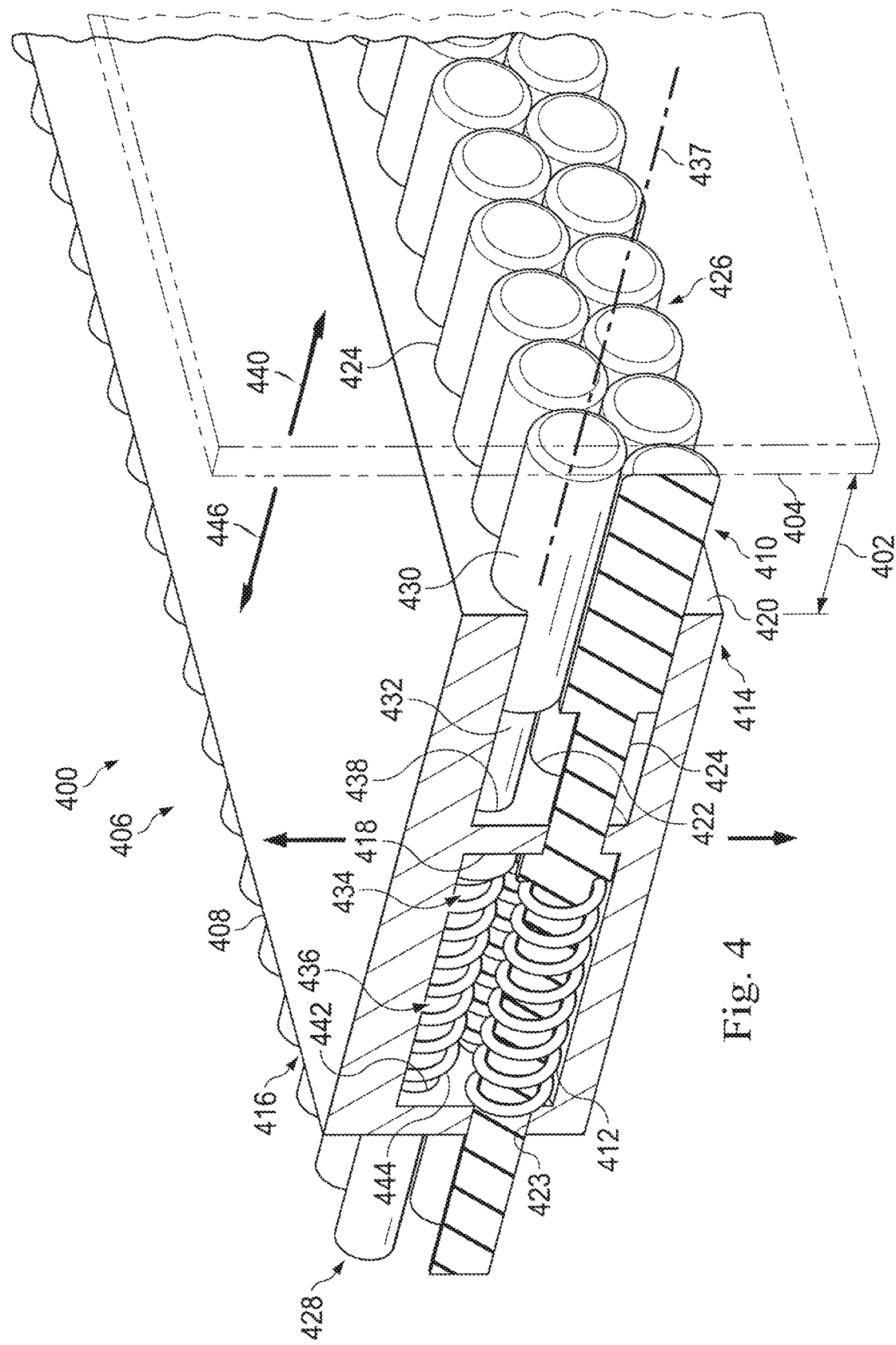
FIG. 4 is an illustration of a perspective cross-sectional view, taken along lines 4-4 in FIG. 1, of a seal system being used to seal a gap between a structure and a surface in accordance with an example embodiment.

FIG. 4 is an illustration of a perspective cross-sectional view, taken along lines 4-4 in FIG. 1, of a seal system being used to seal a gap between a structure and a surface of exhaust system 100 from FIG. 1, depicted in accordance with an example embodiment. Seal system 400 is used to seal a gap 402 between surface 404 and structure 406. Seal system 400, gap 402, surface 404, and structure 406 are examples of implementations for seal system 312, gap 310, surface 306, and structure 308, respectively, in FIG. 3.

Seal system 400 includes a housing 408, a plurality of seals 410, and a plurality of springs 412. Housing 408 may be an example of one implementation of housing 316 in FIG. 3. Further, each of the seals 410 and each of the springs 412 may be an example of one implementation of seal 318 and energy storing device 320, respectively, in FIG. 3.

In this example embodiment, housing 408 is formed as part of structure 406. In other example embodiments, housing 408 may be coupled to structure 406 in some other manner. As depicted, housing 408 includes a first end 414, a second end 416, and a wall 418 located between first end 414 and second end 416. Housing 408 also includes an outer surface 420 at first end 414. The outer surface 420 of housing 408 is part of an outer surface of structure 406 in this example embodiment.

Housing 408 further includes an opening 421 at first end 414, a plurality of openings 422 in wall 418, and a plurality of openings 423 at second end 416. The opening 421 at first ends 414 extends from first end 414 to wall 418 of housing 408. The openings 422 in wall 418 and the openings 423 at second end 416 of housing 408 are shaped and sized to receive the seals 410.

As depicted, each of the seals 410 has a cylindrical shape and extends from surface 404, across gap 402, and into housing 408. Seal 424 is an example of one of the seals 410. Seal 424 has a first end 426 and a second end 428 with a plurality of sections between first end 426 and second end 428. First end 426 is positioned to contact surface 404. In one example embodiment, seal 424 includes a first section 430, a second section 432, a third section 434, and a fourth section 436, each of which has a cylindrical shape aligned along a same center axis 437.

First section 430 extends from surface 404, across gap 402, and into housing 408 through opening 421 of housing 408. Second section 432 extends from first section 430 into a corresponding opening 438 of the openings 422 in wall 418. Second section 432 has a smaller diameter than first section 430. Third section 434 extends from wall 418 towards second end 416 of housing 408. Third section 434 has a larger diameter than second section 432 and the corresponding opening 438. Thus, third section 434 limits motion of seal 318 in a first direction 440 along center axis 437. Fourth section 436 extends from third section 434 towards second end 416 of housing 408, and enters a corresponding opening 442 of the openings 423 at second end 416 of housing 408. Fourth section 436 may be translatable along center axis 437 relative to housing 408. Fourth section 436 has a smaller diameter than third section 434.

As depicted, a spring 444 is positioned around fourth section 436 of seal 424 and is engaged with third section 434 of seal 424. Further, spring 444 is coupled to housing 408. Spring 444 is an example of one of the springs 412. Spring 444 biases seal 424 in the first direction 440 towards surface 404 while also enabling relative motion between housing 408 and seal 424. In this manner, as gap 402 changes in size, spring 444 ensures that first end 426 of seal 424 substantially maintains contact with surface 404, to thereby reduce a flow of fluid through gap 402.

For example, movement of structure 406 relative to surface 404 may cause gap 402 to change in size. In one example, movement of structure 406 may narrow gap 402. When gap 402 narrows, spring 444 compresses, allowing housing 408 to translate in first direction 440 towards surface 404 relative to seal 424. In particular, seal 424 translates in a second direction 446 such that a larger portion of first section 430 of seal 424 enters further into housing 408. Spring 444 ensures that first end 426 of seal 424 substantially maintains contact with surface 404.

In another example, movement of structure 406 may widen gap 402. When gap 402 widens, spring 444 extends, allowing housing 408 to translate in second direction 446 away from surface 404 relative to seal 424. In particular, seal 424 translates in first direction 440 such that a smaller portion of first section 430 of seal 424 is located within housing 408. Spring 444 ensures that first end 426 of seal 424 substantially maintains contact with surface 404.

The seals 410 are arranged in a plurality of rows 448 to create a tortuous flow path to reduce the flow of fluid (e.g. exhaust) through the gap 402. A flow path is tortuous when it makes it more difficult or impossible for a fluid to pass through gap along a straight path. A tortuous flow path may include twists and turns and may be complex in comparison with a substantially straight flow path. Further, in some cases, a tortuous flow path may cause a fluid that enters the flow path to be trapped within the flow path. As the number of rows 448 of the seals 410 increases, the flow path created by the seals 410 becomes more tortuous. Further, the seals 410 may be arranged close-packed to minimize the amount of space in between the seals 410 and further add to the tortuousness of the flow path between the seals 410.

In one example embodiment, each of the seals 410 has a same diameter at the first end of each seal. In other example embodiments, these first ends may have different diameters. In still other example embodiments, the first ends of a first row of the seals 410 may have the same diameter, while the first ends of a second row of the seals may have the same diameter but different from the first row.

Each of the seals 410 may have a length scaled to accommodate the size of gap 402. In one example embodiment, the gap 402 may vary between about 0.1 inches and about 0.5 inches. Each of the seals 410 may have lengths that allow each seal to continuously seal the gap 402 even when the gap 402 varies in size. In other example embodiments, the gap 402 may vary between about 0.1 inches and about 2 inches. In still other example embodiments, the gap 402 may vary between about 0.5 inches and about 3 inches.

Figure 5:
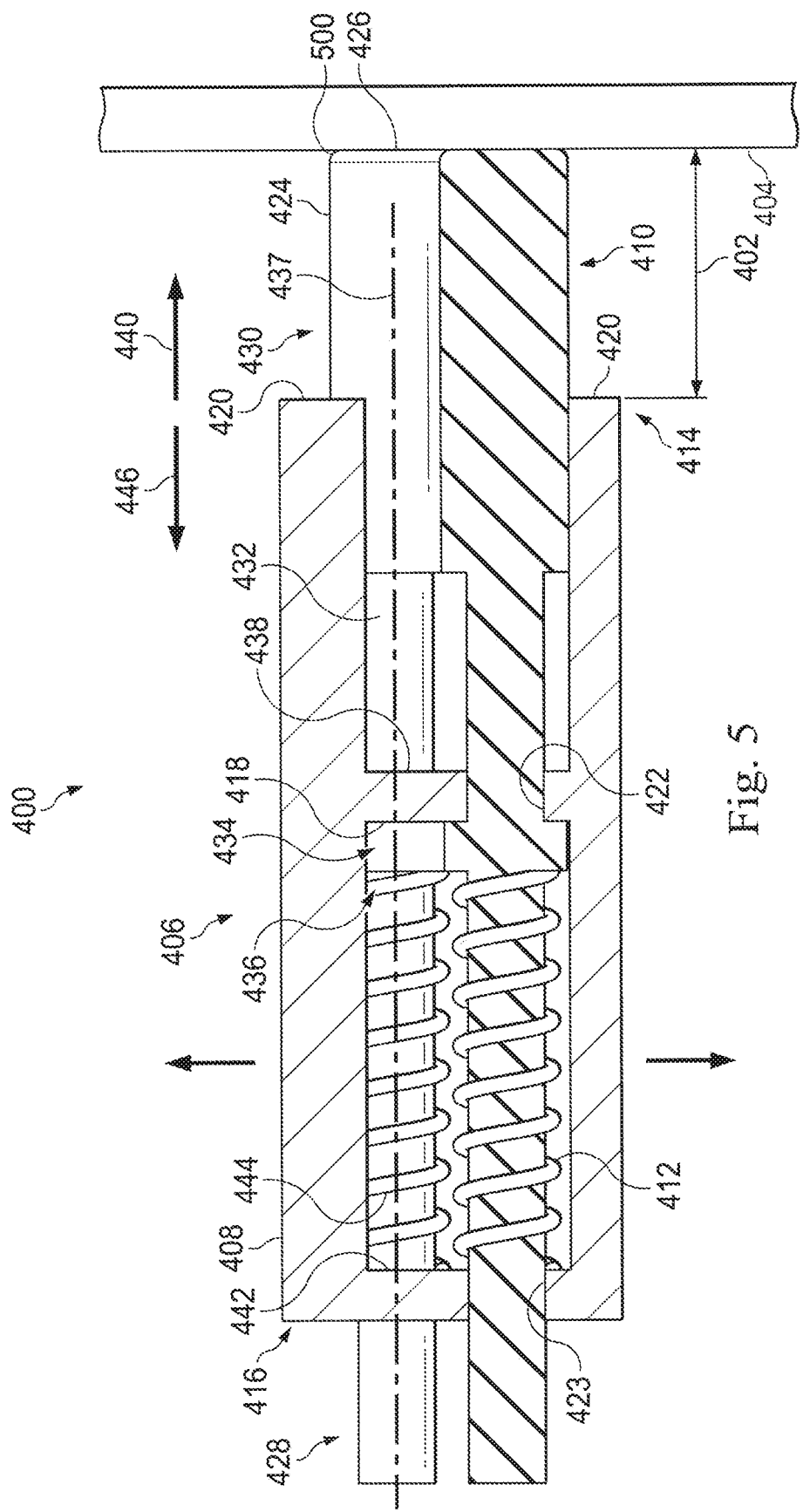
FIG. 5 is an illustration of a side view of the seal system in FIG. 5 in accordance with an example embodiment.

FIG. 5 is an illustration of a side view of seal system 400 from FIG. 4, depicted in accordance with an example embodiment. As depicted, first end 426 of the seal 424 is substantially flat such that first end 426 substantially conforms to surface 404, which is also substantially flat. Further, first end 426 has beveled edge 500 that extends circumferentially around first end 426 of seal 424. Factors that help improve the durability and wear resistance of seal 424 include the cylindrical shape of seal 424, first end 426 being substantially flat, and first end 426 having beveled edge 500.

In other example embodiments, surface 404 may be non-planar and first end 426 of seal 424 may be shaped to substantially conform to a corresponding portion of surface 404 that first end 426 is meant to contact. For example, first end 426 may have a curved shape to allow first end 426 to substantially conform to a curved portion of surface 404. In some example embodiments, the seals 410 may have first ends that are shaped (e.g. curved) in different ways to substantially conform to the different corresponding portions of surface 404 that the first ends are meant to contact.

In one example embodiment, each of the seals 410 and each of the springs 412 are implemented in a manner similar to seal 424 and spring 444, respectively. However, in other example embodiments, the seals 410 may not each individually have fourth sections, similar to fourth section 436. Rather, the third sections of the seals 410 may all be coupled to a single structure that connects these seals 410. A single spring may then be positioned around this single structure and also engaged with each of the third sections of the seals 410.

Figure 6:
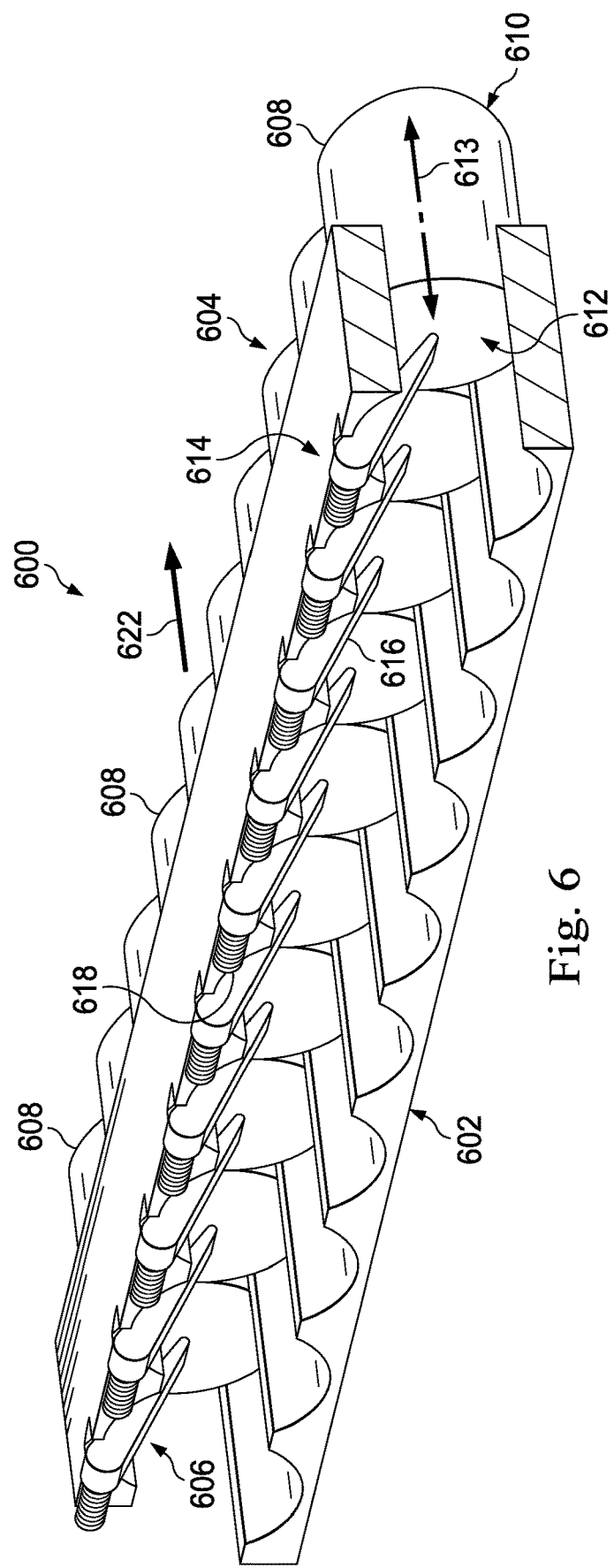
FIG. 6 is an illustration of a perspective cross-sectional view, taken along lines 6-6 in FIG. 1, of a seal system that may be used to seal a gap between a structure and a surface in accordance with an example embodiment.

FIG. 6 is an illustration of a perspective cross-sectional view, taken along lines 6-6 in FIG. 1, of a seal system that may be used to seal a gap between a structure and a surface of exhaust system 100 from FIG. 1 depicted in accordance with an example embodiment. Seal system 600 is another example of one implementation of seal system 312 described in FIG. 3. Seal system 600 includes a housing 602, a plurality of seals 604, and a plurality of lever systems 606. Housing 602 may be an example of one implementation of housing 316 in FIG. 3. Each of the seals 604 may be an example of one implementation of seal 318 in FIG. 3. Further, each of the lever systems 606 may be an example of one implementation of lever system 334 in FIG. 3.

Housing 602 may be coupled to a structure (now shown), such as structure 308 described in FIG. 3. Housing 602 may be formed as part of structure 308 or may be a separate component attached to structure 308.

Each of the seals 604 has a cylindrical shape. Seal 608 is an example of one of the seals 604. Seal 608 includes a first end 610 and a second end 612. Seal 608 may have the same diameter from first end 610 to second end 612. Seal 608 is coupled to housing 602 in a manner such that seal 608 is translatable relative to housing 602 along axis 613 through seal 608. The relative movement between seal 608 and housing 602 is controlled by lever system 614.

Seal 608 is loaded or biased by a corresponding lever system 614. Lever system 614 is an example of one of the lever systems 606. Lever system 614 includes a lever 616 and a torsion spring 618 coupled to the lever 616. Lever 616 is rotatable about axis 613 that passes through lever systems 606. Torsion spring 618 biases lever 616 such that lever 616 exerts a force against second end 612 of seal 608 in a direction 622 along axis 613 through seal 608. In this manner, when seal 608 is positioned against a surface (not shown) lever system 614 allows seal 608 to translate in and out of housing 602 while continuously exerting a force against second end 612 of seal 608 to ensure that first end 610 of seal 608 substantially maintains contact with that surface.

For example, seal system 600 may be used to seal a gap (not shown) between a surface (not shown) and the structure (not shown) to which housing 602 is coupled. The gap may have a variable geometrical configuration. In other words, the gap may be a variable geometry gap. For example, the gap may vary in size over time. Lever system 614 ensures that the first ends of the seals 604, including first end 610 of seal 608, substantially maintain contact with the surface to thereby seal the gap and reduce a flow of fluid (e.g. exhaust) through the gap. In other words, seal system 600 is used to seal this gap continuously regardless of changes in the size of the gap.

Figure 7:
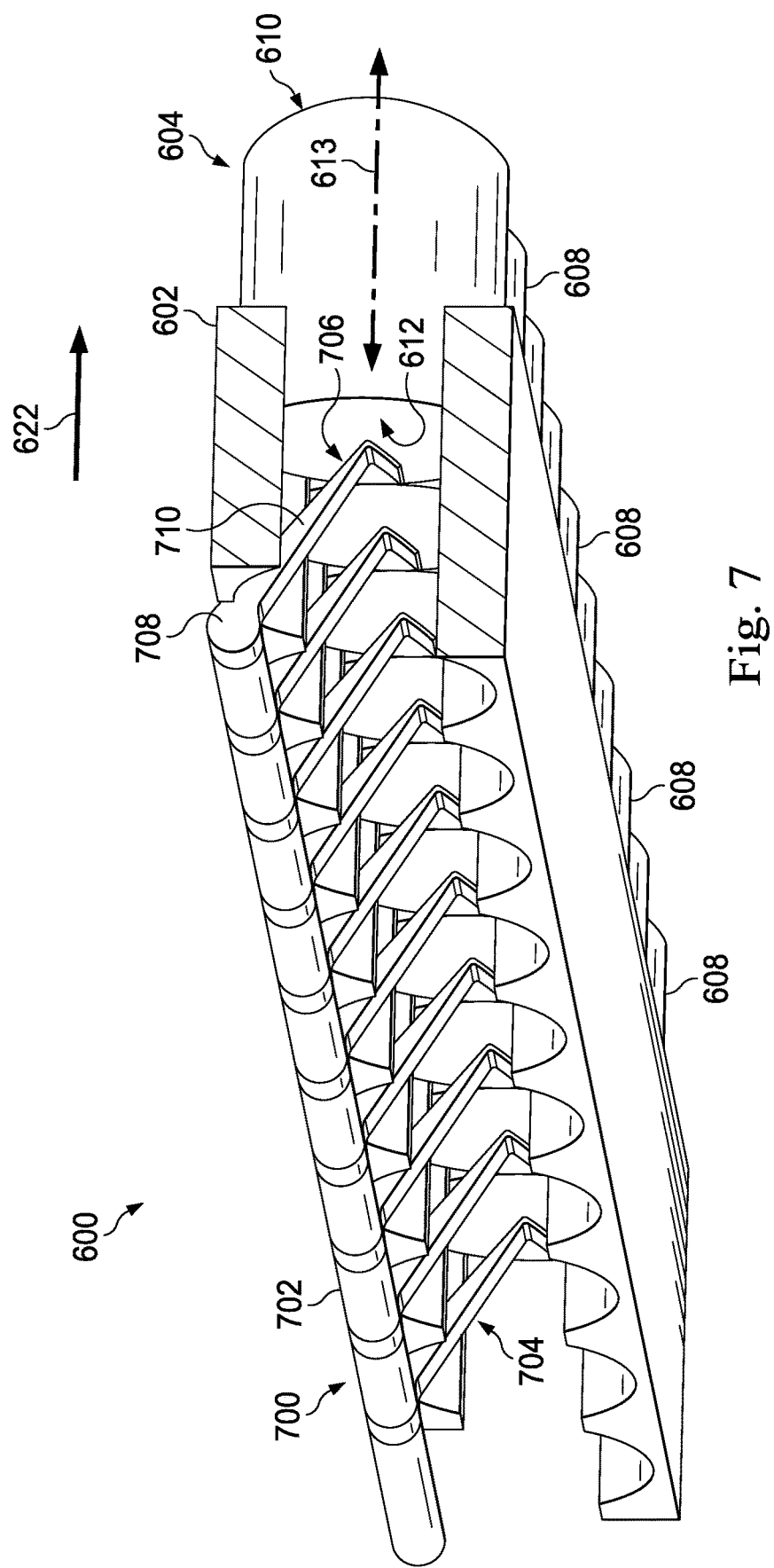
FIG. 7 is an illustration of a different implementation of the seal system from FIG. 6 in accordance with an example embodiment.

FIG. 7 is an illustration of a different implementation of seal system 600 from FIG. 6 depicted in accordance with an example embodiment. In this example embodiment, lever systems 606 of seal system 600 have been replaced with a single lever system 700. Lever system 700 includes an elongate member 702 and a plurality of levers 704 coupled to the elongate member 702.

In one example embodiment, each of levers 704 may be comprised of a flexible but resilient material that allows each lever to bend in response to force but to return to its original or base shape when that force is removed. Lever 706 is an example of one of the levers 704. Lever 706 includes base portion 708 and resilient portion 710. Base portion 708 is fixedly coupled to elongate member 702. In one example embodiment, resilient portion 710 may be comprised of a flexible material that allows resilient portion 710 to bend in response to force but to return to its original shape when that force is reduce or removed. Thus, resilient portion 710 is positioned relative to and engaged with seal 608 such that resilient portion 710 biases seal 608 in the direction 622 along axis 613.

Each of levers 704 may be implemented in a manner similar to lever 706. For example, each of levers 704 may have a base portion that is coupled to elongate member 702 and a resilient portion 710 that biases a corresponding seal of seals 604 in the direction 622 while still allowing relative motion between the corresponding seal and housing 602.

The illustrations of seal system 400 in FIGS. 4 and 5 and seal system 600 in FIGS. 6 and 7 are not meant to imply physical or architectural limitations to the manner in which an illustrative embodiment may be implemented. Other components in addition to or in place of the ones illustrated may be used. Some components may be optional. Further, as described above, the different components shown in FIGS. 4-7 may be illustrative examples of how components shown in block form in FIG. 3 can be implemented as physical structures. Additionally, some of the components in FIGS. 4-7 may be combined with components in FIG. 3, used with components in FIG. 3, or a combination thereof.

Figure 8:
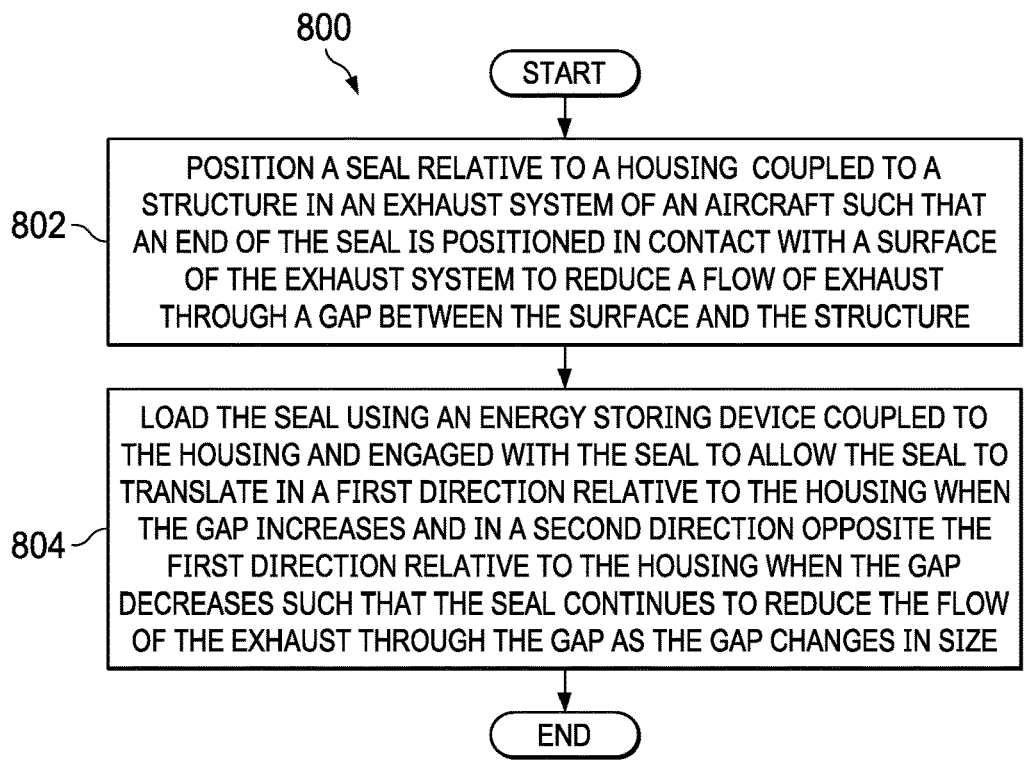
FIG. 8 is a flowchart of a process for sealing a gap between a surface and a structure in an exhaust system of an aircraft using a seal in accordance with an example embodiment.

FIG. 8 is a flowchart of a process 800 for sealing a gap between a surface and a structure in an exhaust system of an aircraft using a seal depicted in accordance with an illustrative embodiment. The process 800 may be implemented using, for example, seal system 312 described in FIG. 3.

The process 800 may begin by positioning a seal 318 relative to a housing 316 that is coupled to a structure 308 in an exhaust system 300 of an aircraft 304 such that an end 322 of the seal 318 is positioned in contact with a surface 306 of the exhaust system 300 to reduce a flow of exhaust 314 through a gap 310 between the surface 306 and the structure 308 (step 802). In one example embodiment, the exhaust system 300 is a jet engine exhaust system. At step 802, the end 322 of the seal 318 in contact with the surface 306 may be substantially flat. In one example embodiment, the end 322 may have a beveled edge that extends circumferentially around the seal 318.

Further, the seal 318 is loaded using an energy storing device 320 coupled to the housing 316 and engaged with the seal 318 to allow the seal 318 to translate in a first direction relative to the housing 316 when the gap 310 increases and in a second direction opposite the first direction relative to the housing 316 when the gap 310 decreases such that the seal 318 continues to reduce the flow of the exhaust 314 through the gap 310 as the gap 310 changes in size (step 804), with the process terminating thereafter. At step 804, the flow of the exhaust 314 through the gap 310 may be reduced to within selected tolerances or may be fully prevented.

Figure 9:
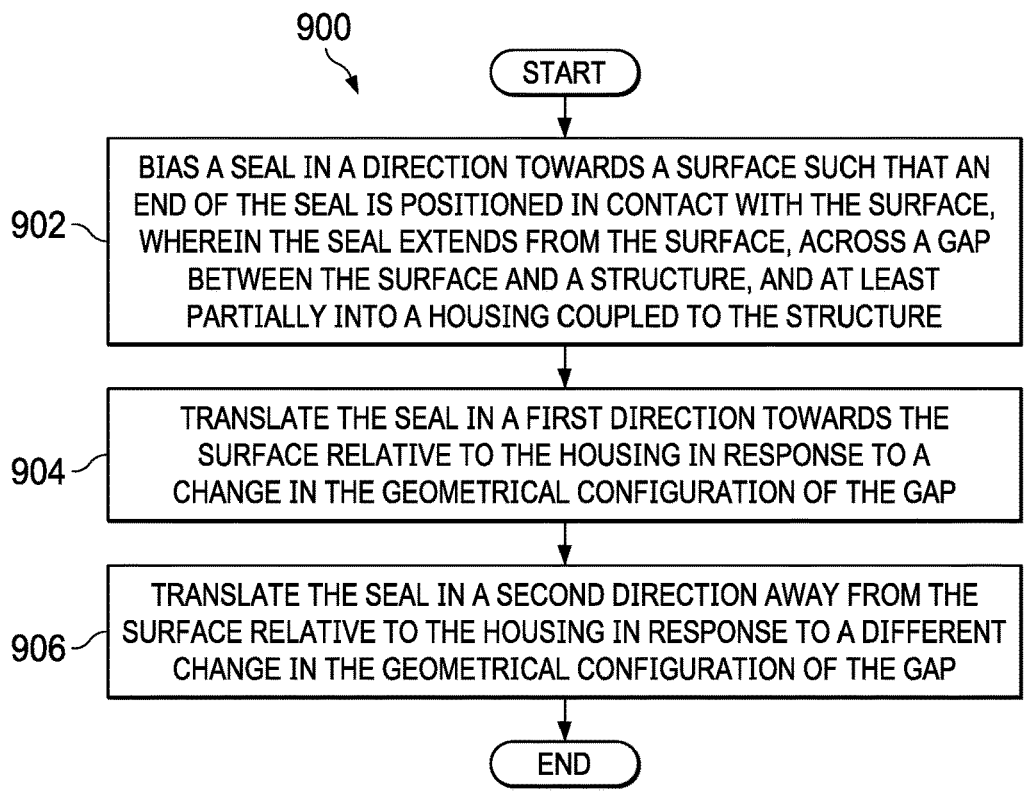
FIG. 9 is a flowchart of a process for biasing a seal and translating a seal in response to changes in the geometrical configuration of a gap sealed by the seal in accordance with an example embodiment.

FIG. 9 is a flowchart of a process 900 for biasing a seal and translating the seal in response to changes in the geometrical configuration of a gap sealed by the seal depicted in accordance with an illustrative embodiment. The process 900 may be implemented using, for example, seal system 312 described in FIG. 3.

The process 900 may begin by biasing a seal 318 in a direction towards a surface 306 such that an end 322 of the seal 318 is positioned in contact with the surface 306, wherein the seal 318 extends from the surface 306, across a gap 310 between the surface 306 and a structure 308, and at least partially into a housing 316 coupled to the structure 308 (step 902). The seal 318 is translated in a first direction towards the surface 306 relative to the housing 316 in response to a change in the geometrical configuration of the gap 310 (step 904). In one example embodiment, at step 904, the seal 318 translates in the first direction in response to at least a narrowing of the gap 310. The seal 318 is translated in a second direction away from the surface 306 relative to the housing 316 in response to a different change in the geometrical configuration of the gap 310 (step 906), with the process terminating thereafter. In one example embodiment, at step 906, the seal translates in the second direction in response to at least a widening of the gap.

Figure 10:
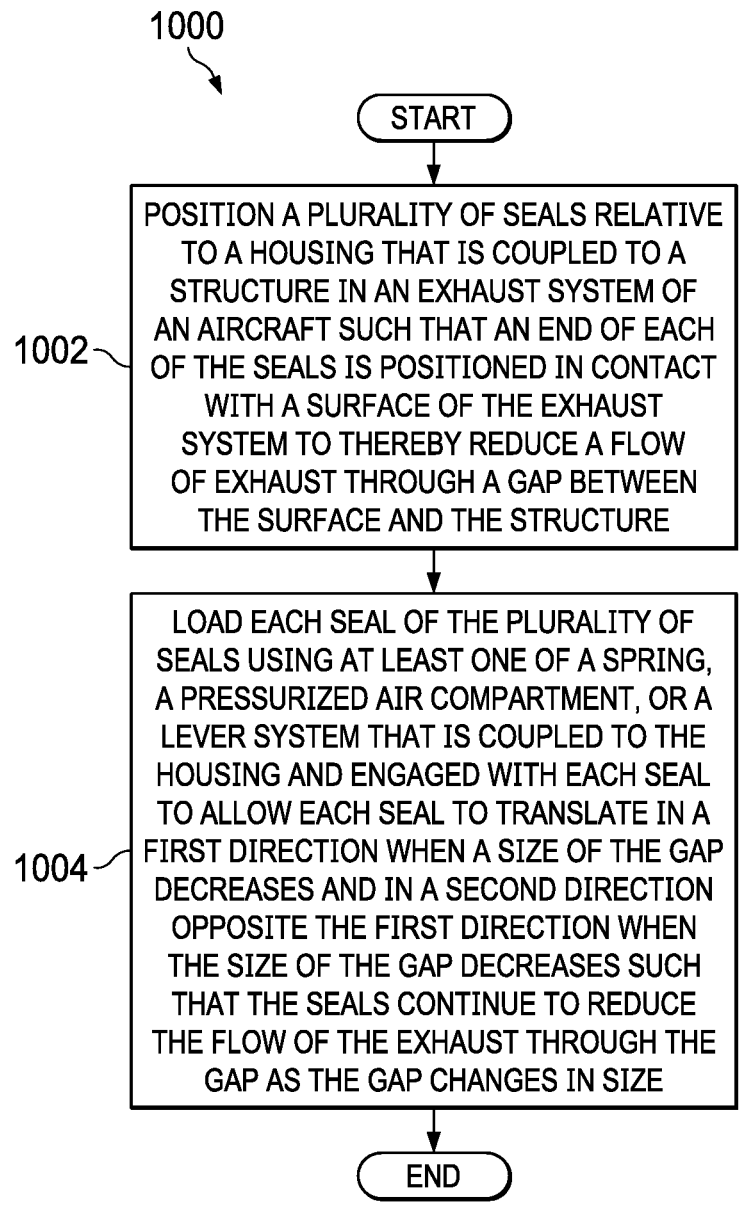
FIG. 10 is a flowchart of a process for sealing a gap between a surface and a structure in an exhaust system of an aircraft using a plurality of seals loaded using at least one of a spring, a pressurized air compartment, or a lever system in accordance with an example embodiment.

FIG. 10 is a flowchart of a process 1000 for sealing a gap between a surface and a structure in an exhaust system of an aircraft using a plurality of seals loaded using at least one of a spring, a pressurized air compartment, or a lever system depicted in accordance with an illustrative embodiment. The process 1000 may be implemented using, for example, seal system 312 described in FIG. 3. In one example embodiment, the process 1000 may be implemented using seal system 400 in FIGS. 4 and 5 or seal system 600 in FIGS. 6 and 7.

The process 800 may begin by positioning a plurality of seals relative to a housing that is coupled to a structure in an exhaust system of an aircraft such that an end of each of the seals is positioned in contact with a surface of the exhaust system to thereby reduce a flow of exhaust through a gap between the surface and the structure (step 1002). In one example embodiment, at step 1002, the plurality of seals may be arranged in a plurality of rows to create a tortuous flow path. The greater the number of rows, the more tortuous is the flow path.

Further, each seal of the plurality of seals is loaded using at least one of a spring, a pressurized air compartment, or a lever system that is coupled to the housing and engaged with each seal to allow each seal to translate in a first direction when a size of the gap decreases and in a second direction opposite the first direction when the size of the gap decreases such that the seals continue to reduce the flow of the exhaust through the gap as the gap changes in size (step 1004), with the process terminating thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Figure 11:
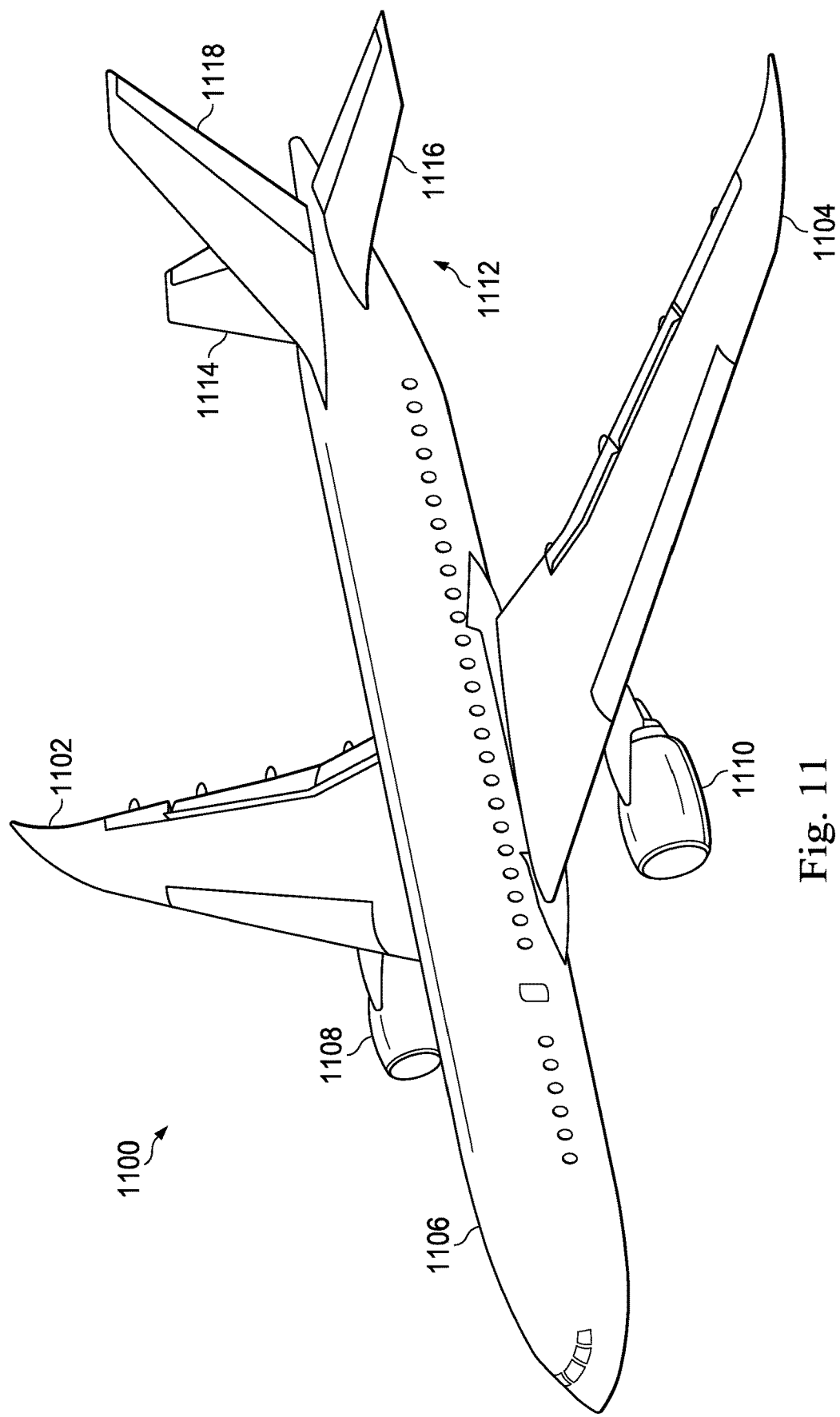
FIG. 11 is an illustration of a perspective view of an aircraft having aircraft systems with one or more gaps having variable geometrical configurations in accordance with an example embodiment.

FIG. 11 is an illustration of a perspective view of an aircraft having aircraft systems with one or more gaps having variable geometrical configurations depicted in accordance with an illustrative embodiment. Aircraft 1100 is an example of one implementation of aircraft 304 in FIG. 3. Aircraft 1100 includes wing 1102, wing 1104, fuselage 1106, engine system 1108, engine system 1110, and tail section 1112. Tail section 1112 includes horizontal stabilizer 1114, horizontal stabilizer 1116, and vertical stabilizer 1118.

Aircraft 1100 has aircraft systems, each having one or more gaps with variable geometrical configurations. For example, engine system 1108 and engine system 1110 may be examples of implementations of engine system 302 described in FIG. 3. In one example embodiment, each of engine system 1108 and engine system 1110 may include an exhaust system, such as exhaust system 300. Further, one or more seal systems, such as seal system 312 described in FIG. 3, may be used to seal one or more gaps within the exhaust system of each of engine system 1108 and engine system 1110, where the one or more gaps have geometrical configurations that vary during operation of aircraft 1100.

Thus, the example embodiments described above provide a method and apparatus for gaps in exhaust systems that have variable geometrical configurations. For example, seal system 312 described in FIG. 3 may be used to seal gap 310 in exhaust system 300 even as gap 310 changes in size and may continuously reduce the flow of exhaust 314 through gap 310. In some example embodiments, seal system 312 may include a plurality of the seals 318 that are arranged to create a tortuous flow path that reduces the flow of exhaust 314 through gap 310.

In this manner, one or more seal systems, such as seal system 312, may be used to reduce the leakage of fluid through variable geometry gaps in one or more aircraft systems of an aircraft thereby improving the overall the aerodynamic performance of the aircraft. For example, seal system 312 may be used to reduce the leakage of exhaust through a variable geometry gap in an exhaust system to thereby improve aerodynamic performance. Further, seal system 312 includes one or more seals having a cylindrical shape and a substantially flat end that contacts the fixed surface may be more durable and resistant to wear and fatigue as compared to other types of seals.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and five of item C; three of item B and six of item C; or some other suitable combination.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent a module, a segment, a function, and/or a portion of an operation or step. In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
a housing coupled to a structure in an exhaust system of an aircraft, wherein the structure is positioned relative to a surface within the exhaust system such that a gap is present between the surface and the structure;
a seal having an end positioned in contact with the surface to reduce a flow of an exhaust through the gap and coupled to the housing such that at least a portion of the seal extends within the housing, wherein the seal has a cylindrical shape and wherein the end of the seal that contacts the surface is substantially flat; and
an energy storing device coupled to the housing and engaged with the seal such that the energy storing device allows the seal to translate in a first direction relative to the housing when the gap increases and in a second direction opposite the first direction relative to the housing when the gap decreases such that the seal continues to reduce the flow of the exhaust through the gap as the gap changes in size.

2. The apparatus of claim 1, wherein the gap increases when the structure moves away from the surface and decreases when the structure moves closer to the surface.

3. The apparatus of claim 1, wherein the energy storing device comprises:
a spring attached to the housing and engaged with a section of the seal to bias the seal in the first direction towards the surface.

4. The apparatus of claim 1, wherein the energy storing device comprises:
a pressurized air compartment coupled to the housing and engaged with the seal, wherein the pressurized air compartment contains pressurized air that biases the seal in the first direction towards the surface.

5. The apparatus of claim 1, wherein the exhaust system is a jet engine exhaust system.

6. The apparatus of claim 1 further comprising:
a plurality of the seals, wherein the energy storing device is engaged with the seals to allow the seals to translate in the first direction relative to the housing when the gap increases and in the second direction opposite the first direction relative to the housing when the gap decreases such that the seals continue to reduce the flow of the exhaust through the gap as the gap changes in size.

7. The apparatus of claim 1, wherein the housing is part of the structure.

8. The apparatus of claim 7, wherein the gap increases or decreases based on at least one of the structure moving relative to the surface, a flight condition of the aircraft, a temperature within the exhaust system, or a pressure within the exhaust system.

9. The apparatus of claim 1, wherein the end of the seal has a beveled edge that extends circumferentially around the seal.

10. The apparatus of claim 1, wherein the energy storing device includes a lever system comprising a lever and a torsion spring configured to bias biases the seal in the first direction towards the surface.

11. The apparatus of claim 1 further comprising:
a plurality of the energy storing devices; and
a plurality of the seals,
  wherein each of the seals has a beveled edge at the end of each of the seals;
  wherein the energy storing devices are coupled to the housing and engaged with the seals to allow the seals to translate in the first direction relative to the housing when the gap increases and in the second direction opposite the first direction relative to the housing when the gap decreases such that the seals continue to reduce the flow of the exhaust through the gap as the gap changes in size; and
  wherein the gap increases or decreases based on at least one of the structure moving relative to the surface, a flight condition of the aircraft, a temperature within the exhaust system, or a pressure within the exhaust system.

12. An aircraft comprising:
a housing coupled to a structure in an exhaust system of the aircraft, wherein the structure is positioned relative to a surface of the exhaust system such that a gap is present between the surface and the structure;
a plurality of seals arranged in a selected configuration to create a tortuous flow path through the gap, wherein each of the seals has an end positioned in contact with the surface to reduce a flow of an exhaust through the gap, wherein the seal has a cylindrical shape and wherein the end of the seal that contacts the surface is substantially flat; and
a plurality of energy storing devices, wherein each of the energy storing devices is coupled to the housing and engaged with a corresponding seal of the seals to allow the corresponding seal to translate in a first direction relative to the housing when the gap increases and in a second direction opposite the first direction relative to the housing when the gap decreases such that the seals continue to reduce the flow of the exhaust through the gap as the gap changes in size.

13. The aircraft of claim 12, wherein the selected configuration includes a plurality of rows that create the tortuous flow path for the exhaust through the gap, thereby reducing the flow of the exhaust through the gap.

14. The aircraft of claim 12, wherein each of the energy storing devices includes at least one of a spring, a lever system, or a pressurized air compartment.

15. The aircraft of claim 12, wherein the surface is non-planar and wherein the end of each of the seals is shaped to substantially conform to a corresponding portion of the surface that the end contacts.

16. A method comprising:
positioning a seal relative to a housing that is coupled to a structure in an exhaust system of an aircraft such that an end of the seal is positioned in contact with a surface of the exhaust system to reduce a flow of an exhaust through a gap between the surface and the structure, wherein the seal has a cylindrical shape and wherein the end of the seal that contacts the surface is substantially flat; and
loading the seal using an energy storing device coupled to the housing and engaged with the seal to allow the seal to translate in a first direction relative to the housing when the gap increases and in a second direction opposite the first direction relative to the housing when the gap decreases such that the seal continues to reduce the flow of the exhaust through the gap as the gap changes in size.

17. The method of claim 16, wherein loading the seal using the energy storing device comprises:
loading the seal using a spring coupled to the housing and engaged with the seal to allow the seal to translate in the first direction relative to the housing when the gap increases and in the second direction opposite the first direction relative to the housing when the gap decreases.

18. The method of claim 16, wherein loading the seal using the energy storing device comprises:
loading the seal using pressurized air in a pressurized air compartment coupled to the housing and engaged with the seal to allow the seal translate in the first direction relative to the housing when the gap increases and in the second direction opposite the first direction relative to the housing when the gap decreases.

* * * * *